United States Patent [19]
Levine

[11] Patent Number: 5,297,204
[45] Date of Patent: Mar. 22, 1994

[54] VCR WITH CABLE TUNER CONTROL

[75] Inventor: Michael R. Levine, Boca Raton, Fla.

[73] Assignee: Smart VCR Limited Partnership, Ann Arbor, Mich.

[21] Appl. No.: 805,300

[22] Filed: Dec. 10, 1991

Related U.S. Application Data

[63] Continuation-in-part of Ser. No. 609,291, Nov. 5, 1990, Pat. No. 5,123,046.

[51] Int. Cl.[5] ............... H04N 7/167; H04H 1/02; H04B 10/04; H04B 10/06
[52] U.S. Cl. ............... 380/10; 380/52; 358/335; 340/825.72; 341/176; 455/151.2; 359/146; 348/734
[58] Field of Search ............... 380/7, 10, 49, 52; 358/349, 86, 194.1; 455/5, 6, 131, 151.1, 151.2, 151.4; 340/825.72; 341/176; 359/146

[56] References Cited

U.S. PATENT DOCUMENTS

| | | | |
|---|---|---|---|
| 4,509,211 | 4/1985 | Robbins | 358/86 X |
| 4,631,601 | 12/1986 | Brugliera et al. | 359/146 X |
| 4,792,972 | 12/1988 | Cook, Jr. | 358/349 X |
| 4,885,803 | 12/1989 | Hermann et al. | 340/825.72 X |
| 4,977,455 | 12/1990 | Young | 358/86 X |
| 5,046,093 | 9/1991 | Wachob | 340/825.72 X |
| 5,081,534 | 1/1992 | Geiger et al. | 358/194.1 |
| 5,151,789 | 9/1992 | Young | 358/194.1 |

FOREIGN PATENT DOCUMENTS

| | | | |
|---|---|---|---|
| 2719827 | 11/1978 | Fed. Rep. of Germany | H04N 7/08 |
| 2918846 | 11/1980 | Fed. Rep. of Germany | F26B 13/02 |
| 0026791 | 2/1980 | Japan | H04N 7/18 |
| 0150104 | 11/1980 | Japan | G11B 5/027 |
| 0153432 | 11/1980 | Japan | H04B 1/06 |
| 0096304 | 8/1981 | Japan | G05B 19/02 |

OTHER PUBLICATIONS

Cable Data Advertisement in "Cablevision", vol. 7, No. 34, May 3, 1982.
"Cablevision" Magazine, Feb. 9, 1981.
J. Bennion et al, "Interactive Videodisc Systems for Education", Journal of the SMPTE, vol. 84, No. 12, Dec. 1975; pp. 949-953.
Cable Data Advertisement, "Cablevision", Feb. 9, 1981.
Dap II Advertisement, Nov.-Dec. 1981.
N. Kokado et al, "A Programmable TV Receiver"; IEEE Trans. on Consumer Electronics, Feb. 1976, pp. 69-82.
C. Clifford et al, "Microprocessor Based, Software Defined Television Controller"; IEEE Trans. on Consumer Electronics, Aug. 1978, pp. 436-442.
Cable Data Advertisement in "Cablevision", vol. 7, No. 30, Apr. 5, 1982.

Primary Examiner—Bernarr E. Gregory
Attorney, Agent, or Firm—Krass & Young

[57] ABSTRACT

A single remote control transmitter can advantageously control three units including a cable tuner/descrambler, a video recorder/player and a television receiver. One of these three units, preferably the video recorder/player, is a master unit. It receives remote control signals from a hand held remote control transmitter. The master unit is initialized using on screen prompts to learn the remote control signals for the other units which are slaves. The prompts ask the user to operate various controls on the remote control transmitter of the proposed slave unit, while receiving and analyzing the remote control transmissions. This permits the master unit to build a translation table for control of the slave units. The master unit may include a read only memory of remote control codes for a number of possible slave units. The master unit can abort the initialization process if it recognizes the requested remote control transmission is according to one of the remote control codes stored in the memory. The system preferably separates control of the plural processes so that each one of the cable tuner/descrambler, the video recorder/player and the television receiver are employed for only certain functions.

15 Claims, 3 Drawing Sheets

VCR WITH CABLE TUNER CONTROL

CROSS REFERENCE TO RELATED APPLICATION

This is a continuation-in-part of application Ser. No. 07/609,291, filed Nov. 5, 1990, now U.S. Pat. No. 5,123,046.

FIELD OF THE INVENTION

This invention relates to programmable systems for recording television signals provided to the system on multi-channel sources such as cable or satellite, in which at least certain of the channels require descrambling and more particularly to such a system in which the video recorder/player transmits a signal to the remote control receiver of a tuner/descrambler at the time of occurrence of a program to be recorded, to ensure that the tuner/descrambler is tuned to the channel it is desired to record.

BACKGROUND OF THE INVENTION

Most video recorder/players of the type intended to be used with television receivers include a system for enabling the automatic, unattended recording of programs scheduled for future transmission. In such systems the operator can load a future schedule memory with signals representing the channel, starting time and ending time (or alternatively duration) of one or more future occurring programs that it is desired to record. The system includes a real time clock and when a comparator determines that the present time has reached the starting time of a program to be recorded the tape drive is energized and the channel number stored in the memory is used to control the tuner of the video recorder/player. When the real time reaches the ending time of the program the recording process is terminated.

Often the source of signals for the video recorder/player constitutes either a cable or satellite multi-channel signal including one or more channels which are scrambled to prevent their reception by an unauthorized source. These signals must be descrambled before they can be recorded or displayed on the television receiver. Tuner/descramblers are typically employed for this purpose. Popularly called "cable boxes" these units receive the output of the cable and/or the satellite and may be tuned by the operator, typically employing an infrared remote control device, to a desired channel. The output of the cable box is provided to the video recorder/player and either directly to the T.V. receiver or via the video cassette recorder.

A variety of arrangements may be used to interconnect the tuner/descrambler, the video recorder/player and the T.V. receiver such as those disclosed in U.S. Pat. Nos. 4,630,133 and 4,771,456. Some of these systems allow one channel to be recorded while a different channel is displayed on the T.V. receiver.

In all of these systems the proper recording of a future scheduled television program occurring on one of the scrambled channels requires that the descrambler be tuned to the desired channel at the time of occurrence of the signal to be recorded. Often the future schedule memory is programmed a long time in advance of the time of occurrence of the program to be recorded. If the system is used for real time viewing or recording between the time of programming and the time of occurrence of the future program to be recorded, the channel selector on the descrambler may have been adjusted to tune some channel other than the one that it is desired to record. The operator must then return the descrambler setting to the proper channel before recording for the system to operate properly. Particular difficulty is encountered when the schedule memory is programmed to record two future programs occurring on different scrambled channels. It is then necessary to adjust the scrambler setting after the occurrence of the first program before the occurrence of the second one.

The value to the user of a remote control for various types of electronic equipment has resulted in a proliferation of remote control units. A system including a cable tuner/descrambler, a video recorder/player and a television receiver may have three different remote control units. This results in confusion because the user needs to select the appropriate remote control unit before entering a remote control command. In addition, there is an apparent overlap in functions because each of these units are capable of channel selection. Because of these problems there is a need for a single remote control unit which can operate all the users equipment.

SUMMARY OF THE INVENTION

The present invention is directed toward a system and method of operation which eliminates the need for the operator to ensure that the cable box is tuned to an appropriate channel at the time the signal occurring on that channel is to be recorded by providing means whereby the future schedule memory of the video recorder/player can exercise control over the channel to which the descrambler is tuned using the remote control receiver incorporated in the descrambler.

Broadly, the present invention provides a remote control transmitter which sends a signal to the remote control receiver of the cable box causing it to tune to the appropriate channel at the time the future schedule memory controls the system to record a program occurring on that channel. The video recorder/player system preferably includes a switch which allows the operator to select one of the several popular cable boxes so that the code transmitted to the cable box remote control receiver is appropriate to tune it to the channel dictated by the future schedule memory. The remote control transmitter may also send a signal to the cable box causing it to be energized if its power supply arrangement is such that it is not energized at all times or at least when the video cassette recorder is energized.

In a preferred embodiment of the invention the control that the video recorder/player exercises over energization and tuning of the cable box allows the use of a single remote control transmitter to control both the video recorder/player and the cable box, eliminating the need for separate remote control transmitters for each.

The components which must be added to a conventional video recorder/player to enable use of the system of the present invention are relatively simple and inexpensive and substantially simplify the process of recording future scheduled programs and the overall operation of the system.

A single remote control transmitter can advantageously control three units including a cable tuner/descrambler, a video recorder/player and a television receiver. One of these three units, preferably the video recorder/player, is a master unit. It receives remote control signals from a hand held remote control transmitter. The master unit is initialized using on screen prompts to learn the remote control signals for the other units which are slaves. The prompts ask the user to operate various controls on the remote control transmitter of the proposed slave unit, while receiving and analyzing the remote control transmissions. This permits the master unit to build a translation table for control of the slave units. The master unit may include a read only memory of remote control codes for a number of possible slave units. The master unit can abort the initialization process if it recognizes the requested remote control transmission is according to one of the remote control codes stored in the memory. The system preferably separates control of the plural processes so that each one of the cable tuner/descrambler, the video recorder/player and the television receiver are employed for only certain functions.

BRIEF DESCRIPTION OF THE DRAWINGS

These and other features of the present invention will be described in connection with the accompanying drawings in which.

DETAILED DESCRIPTION OF THE PREFERRED EMBODIMENT

Figure 1:
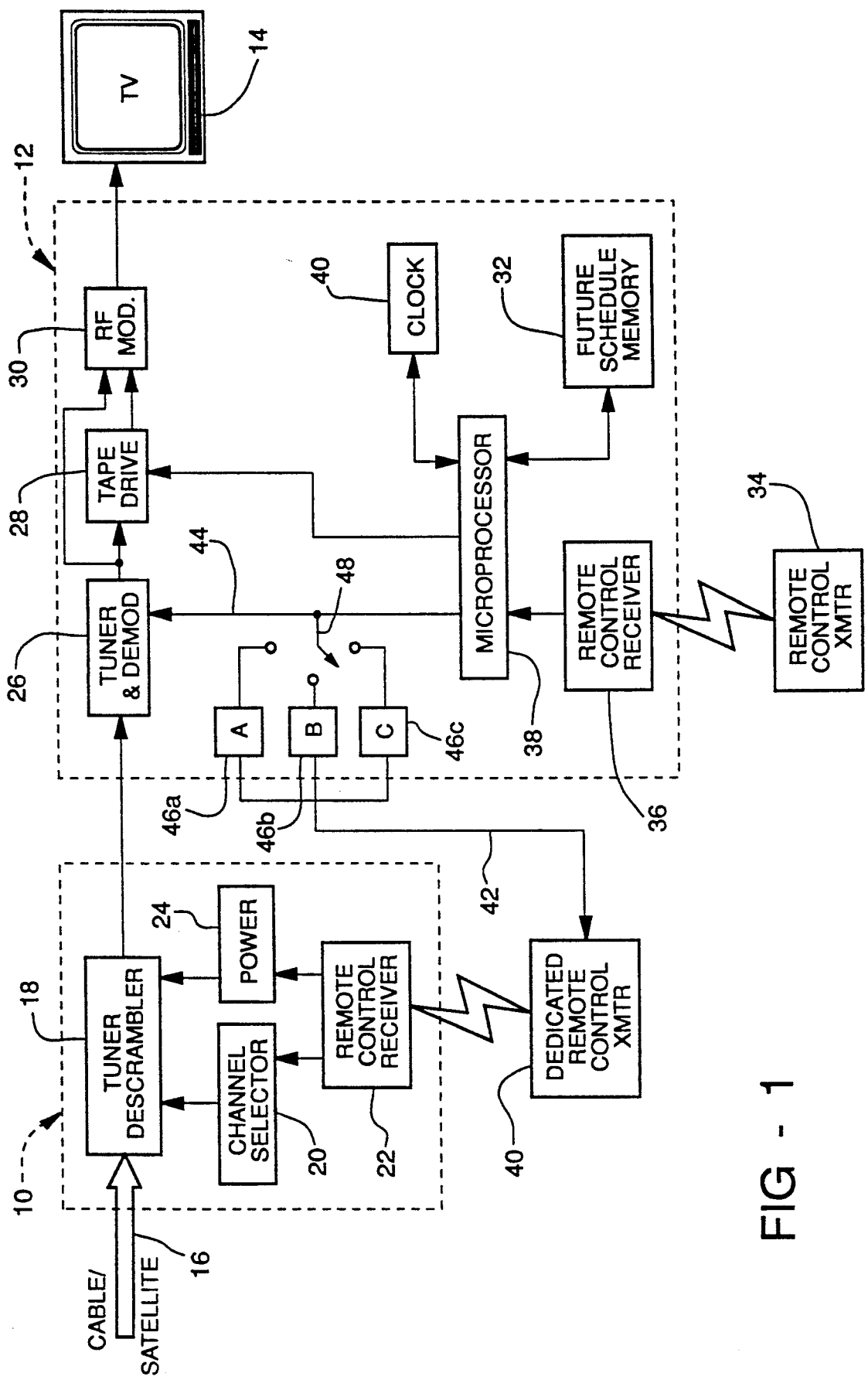
FIG. 1 is a schematic diagram of the preferred embodiment of the invention.

Referring to the drawing, the system of the present invention broadly employs a "cable box," generally indicated at 10, a video recorder/player, generally indicated at 12, and a television receiver 14. This system receives multiple television signals simultaneously over a wide band carrier 16 such as a community cable system or a broadcast satellite. The units are interconnected so as to allow a single television channel on the cable/satellite input 16 to be tuned, descrambled if it constitutes a scrambled premium channel, and either recorded for future playback by the video recorder/player 12 or displayed on the television receiver 14.

The cable box 10, video recorder/player 12 and television receiver 14 can be interconnected in a variety of different manners including the arrangements illustrated in U.S. Pat. Nos. 4,771,456 or 4,630,133 and the present invention is not considered to be limited to the interconnection arrangement illustrated in the figure.

The cable box 10 includes a tuner/descrambler 18 connected to receive the broad band input signal on line 16 and operative to tune and demodulate a single channel and use that signal to remodulate a locally generated radio frequency signal so as to provide the tuned signal on a single channel tunable by the television receiver 14. Typically cable box 10 will be switchable so as to provide an output on either of two adjacent television channels, so that the television receiver 14 may be tuned to whichever of the channels is not used by local television broadcast stations. The channel that unit 18 is tuned to is controlled by a channel selector 20 and if that channel is received in scrambled form, the unit 18 acts to descramble the signal. Typically, the channels will be scrambled if a premium charge is made for their reception.

Channel selector 20 may be typically controlled manually or by output signals from a remote control receiver 22. The remote control receiver may also control the power supply 24 for the cable box.

The output of the tuner/descrambler is provided to a tuner and demodulator unit 26 forming part of the video recorder/player 12. The unit 26 is normally adjustable so that it can receive any channel, but when it is used with a cable box 10 that provides output on a single channel, it must be adjusted to receive the channel which the cable box outputs. The output of the tuner/demodulator 26 is provided both to a tape drive unit 28 to allow recording of the output signal and to an RF modulator 30 providing output to the television receiver 14. The RF modulator is again tuned to a channel that is not used by a television broadcast station in the area. Television receiver, 14 is normally tuned to the output channel of the modulator 30. The playback heads of the tape drive 28 are also connected to the RF modulator 30. The unit employs an internal switching system (not shown) so that the output of the tuner/demodulator 26 is provided to the modulator 30 except when the tape drive is in playback mode.

In order to allow the unattended recording of previously programmed television signals, a future schedule memory 32 may be loaded with digital signals representative of the channel and time of occurrence of the programs which the operator desires to record. The time of occurrence signals may take a variety of forms including start and end time of programs or start time and duration. The operator of the system will normally load signals into the future schedule memory using a remote control transmitter 34 which typically provides infrared control signals to a remote control receiver 36 forming part of the video recorder/player. Signals from the remote control receiver are provided to a microprocessor 38 that loads the signals into the future schedule memory 32.

A real time clock 40 is also connected to the microprocessor 38 which operates to compare present time signals with the times loaded in the future schedule memory for the recording of programs. When real time coincides with the time of occurrence of a program loaded in the future schedule memory 32, the microprocessor sends signals to the tuner and demodulator 26 and to the tape drive 28 causing the proper channel to be tuned and recorded by the tape drive 28.

As heretofore described, the system is conventional and works properly as long as the tuner/descrambler 18 has been tuned to a channel stored in the future schedule memory 32 prior to time of occurrence of a particular program. With alternative connection arrangements in which the cable 16 is provided directly to the tuner/demodulator 26 of the video recorder/player, it is only necessary that the tuner/descrambler 18 forming part of the cable box is properly tuned when a premium channel requiring descrambling is to be recorded. In either arrangement, the failure to maintain the cable box tuned to the proper channel is one of the frequent reasons that the operator does not achieve recording of the desired program.

In order to obviate the possibility of recording the wrong channel because of the tuner/descrambler 18 being improperly tuned at the time of recording, the system of the present invention allows the video recorder/player to achieve control over the channel to which the unit 18 is tuned via a dedicated remote control transmitter 40. Transmitter 40 is permanently positioned relative to the cable box 10 so that its output signals are received by the remote control receiver 22. For example, the transmitter 40 may be taped to the cable box adjacent the remote control receiver 22. The remote control transmitter 40 is connected to the video recorder/player by a flexible cable 42 to allow this positioning. The remote control transmitter 40 is energized by signals outputted by the microprocessor 38 on line 44, representing the channel associated with a program stored for recording in the future schedule memory 32, generated at the time of occurrence of that program.

In order to allow the remote control transmitter 40 to be used with any of the several types of cable boxes which are in use, each of which may employ a different coding for channel selection, the video recorder/player 12 includes three decoders 46a, 46b and 46c which convert the channel selection output signals from the microprocessor into one of three formats, each for use with a different make of cable box 10. A manual selector switch 48 allows one of the three decoders 46a, 46b or 46c to be connected between the microprocessor 38 and the transmitter 40. The remote control transmitter 40 may also send signals to the remote control receiver 22 energizing the power supply 24 at the time of occurrence of a program to be recorded.

Since the only control signals for a cable box 10 constitute the power ON or OFF signal and the channel selection signal, this arrangement allows the remote control transmitter 34 for the video recorder/player 12 to also exercise full control over the cable box 10, thereby eliminating the need for the operator to employ two remote control transmitters for the two units. In this mode the microprocessor 38 would send appropriate channel and power signals to the dedicated remote control transmitter 40 whenever appropriately commanded by the remote control transmitter 34, independent of operation of the future schedule.

In use, the operator may use the remote control transmitter 34 in the manner of the prior art to load channel and time of occurrence of a desired program to be recorded in the future schedule memory 32. Until the time of occurrence of that program the system can be used in the normal manner and the tuner 18 of the cable box 10 can be tuned to any desired channel. When the real time as provided to the microprocessor 38 by the clock 40 coincides with the start time of a program loaded into the future schedule memory the microprocessor sends appropriate control signals to the transmitter 40 to cause tuner 18 to select the appropriate channel. The output signal of the tuner 18 is provided through the tuner and demodulator 26 of the video recorder/player 12 to the tape drive 28, which is also energized by the microprocessor 38, to record the selected program.

FIGS. 2 to 5 illustrate various aspects of a further aspect of this invention. The value to the user of a remote control for various types of electronic equipment has resulted in a proliferation of remote control units. A system including a cable tuner/descrambler, a video recorder/player and a television receiver may have three different remote control units. This results in confusion because the user needs to select the appropriate remote control unit before entering a remote control command. In addition, there is an apparent overlap in functions because each of these units is capable of channel selection. However, in a cable system only the cable tuner/descrambler need be used for channel selection. The cable tuner/descrambler produces a signal on a predetermined channel and both the video recorder/player and the television receiver must tune this channel to properly operate. Use of the remote control unit for either the video recorder/player or the television receiver for channel selection would result in loss of signal.

Because of these problems there is a need for a single remote control unit which can operate all the user's equipment. So called universal remote control units are known in the art. These universal remote control units learn the transmission coding of the various single equipment remote control units. Then the user is capable of putting the universal remote control unit in a mode for control of each of the various systems. This technique reduces the remote control clutter, but does not solve the confusion problem. The user must still be aware of which system he wants to control and put the universal remote control unit in the proper mode. This is equivalent to selecting the proper of the plural remote control units for each system. Also known in the art are remote controls from a single manufacturer which can control differing equipment made by that manufacturer. This solution requires the user to select only that manufacuturer's equipment. In the case of the three pieces of equipment which tend to be used together, a cable tuner/descrambler, a video recorder/player and a television receiver, the user does generally not select the manufacturer of the cable tuner/descrambler but takes the equipment selected by the cable system operator. Thus there is currently no satisfactory solution to the remote control proliferation problem.

Figure 2:
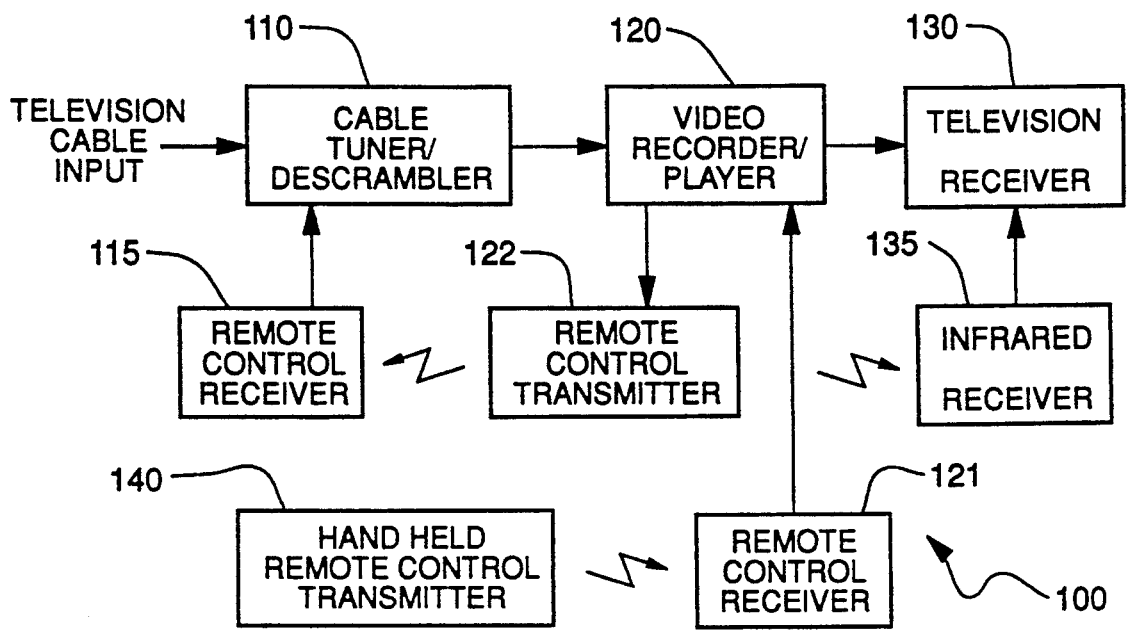
FIG. 2 is a schematic diagram of the manner in which one of the cable tuner/descrambler, the video recorder/player or the television receiver controls the other two units.

The present invention proposes a solution to this problem. FIG. 2 illustrates this schematically. Cable tuner/descrambler 110 receives the multi-channel input signal from the television cable. Cable tuner/descrambler 110 tunes a particular one of these channels, descrambling the signal in the case of authorized reception of a scrambled channel, and produces a television signal on a predetermined channel. It is conventional to provide this output signal on either channel 3 or 4, depending on the broadcast channel not being used in that area. Remote control receiver 115 enables remote control of cable tuner/descrambler 110. The functions controlled may include: the ON/OFF status; and the channel tuned. It is known in the art to control the channel tuned either by scrolling through the channels sequentially, or by direct access in response to the channel number, or both.

Video recorder/player 120 receives the output signal of cable tuner/descrambler 110. Video recorder/player 120 may: record this television signal, either unattended under control of its record program memory or while the user views the television signal via television receiver 130; pass the television signal unaltered to television receiver 130 for current viewing; or playback a previously recorded video tape for viewing via television receiver 130. The playback function may include fast forward and reverse, either blind or while viewing the tape, and stop action. In addition, because generally video recorder/player 120 is constructed to operate by direct broadcast reception, channel selection is generally permitted in much the same manner as described above regarding cable tuner/descrambler 110. The output of video recorder/player 120 is a television signal, generally on the same predetermined channel as the output of cable tuner/descrambler 110 for the same reason. In addition, video recorder/players generally have a bypass mode in which the signals received at its input are passed directly to its output. This bypass mode is useful for simultaneously recording and viewing differing broadcast television channels. Remote control receiver 121 preferably enables all of the operating modes noted above as well as controlling the ON/OFF status of video recorder/player 120.

Television receiver 130 receives the output signal from video recorder/player 120. Television receiver 130 provides a visible and audible output of a selected television signal. This is the useful portion of the system from the point of view of the user. Remote control receiver 135 permits remote control of the operating mode of television receiver 130. The controls normally accessible via remote control receiver 135 include: ON/OFF status; volume by way of a volume increase command and a volume decrease command; and channel selection. Channel selection may be made via sequential scanning or direct access or both.

In accordance with this invention, the user employs a single hand held remote control transmitter 140 for control of all functions of a cable tuner/descrambler, a video recorder/player and a television receiver. One of these units is a master and receives remote control signals from the hand held remote control transmitter 140. The other units are slaves and receive remote control signals from a remote control transmitter formed as part of the master unit. In the preferred embodiment, illustrated in FIG. 2, video recorder/player 120 is the master unit. Video recorder/player 120 employs remote control transmitter 122 for control of both cable tuner/descrambler 110 via remote control receiver 115 and television receiver 130 via remote control receiver 135. Thus both cable tuner/descrambler 110 and television receiver 130 are slaves to video recorder/player 120. Those skilled in the art would realize that any of these three units may operate as the master unit controlling one or both of the other units as slaves.

Figure 3:
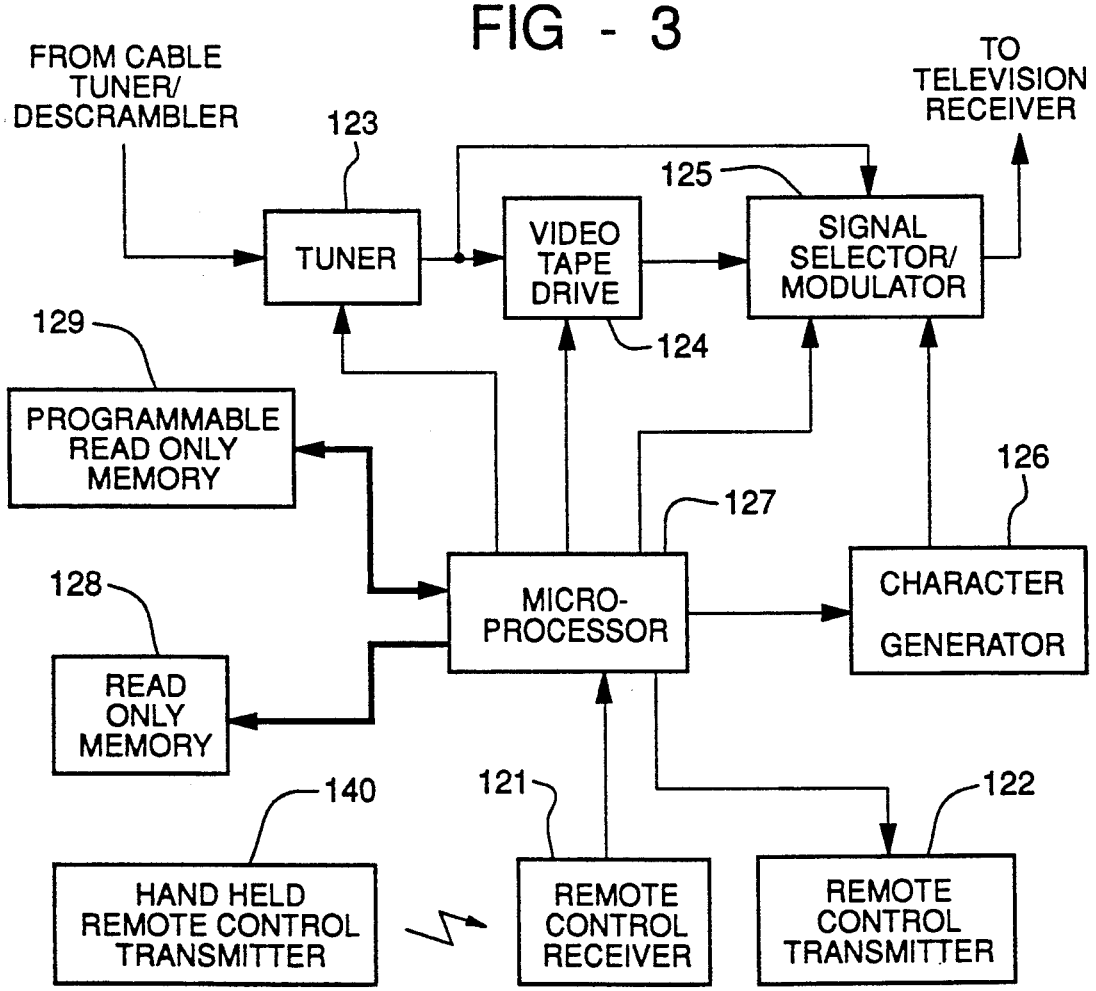
FIG. 3 is a schematic diagram of the video recorder/player which controls the cable tuner/descrambler and the television receiver in accordance with the present invention.

The television receiver is used in teaching video recorder/player 120 the remote control codes needed for control of both cable tuner/descrambler 110 and television receiver 130. FIG. 3 illustrates in schematic form the internal form of video recorder/player 120. Video recorder/player 120 includes tuner 123, which can tune all of the broadcast television channels and optionally may be capable of tuning additional television channels used in cable systems. The separate video and audio signals are supplied to video tape drive 124. Video tape drive 124 includes the capability of recording a program including video and the accompanying audio, playing back the video and audio of a previously recorded program and performing tape transport functions. The output of video tape drive 124 is supplied to signal selector 125. Signal selector/modulator 125 selects the signal to be output from video recorder/player 120. This output is either the signal from tuner 123, the output of video tape drive 124 or the output from character generator 126. Note that signal selector/modulator 125 includes the hardware for modulating the selected signal on the predetermined television channel. The output of selector/modulator 125 is supplied to television receiver 130.

The functions of video recorder/player 120 are controlled by microprocessor 127. Microprocessor 127 preferably includes the capability of storing a program of future programs to be recorded in the manner described above in conjunction with FIG. 1. Microprocessor 127 includes the additional functions of control of cable tuner/descrambler 110 and television receiver 130 via remote control transmitter 122. This process also includes initialization so that microprocessor 127 knows the coding of remote control signal to transmit to control the desire function.

This initialization process takes place employing read only memory 128, programmable read only memory 129, television receiver 130 and the remote control for the particular slave unit. Read only memory 128 includes the program for control of microprocessor 127, data regarding the remote control codes employed by a plurality of possible slave units, and various messages to be described. Upon initial entry into the ON mode, microprocessor 127 checks a particular address in programmable read only memory 129 which indicates whether microprocessor 127 has been initialized for control of the slave units. If microprocessor 127 has been so initialized, then the initialization process described below is skipped. If microprocessor 127 has not been initialized, then the initialization process is begun. There is preferably a method for requesting re-initialization of microprocessor 127. This would be useful, for example, upon replacement of one of the slave units.

Figure 4:
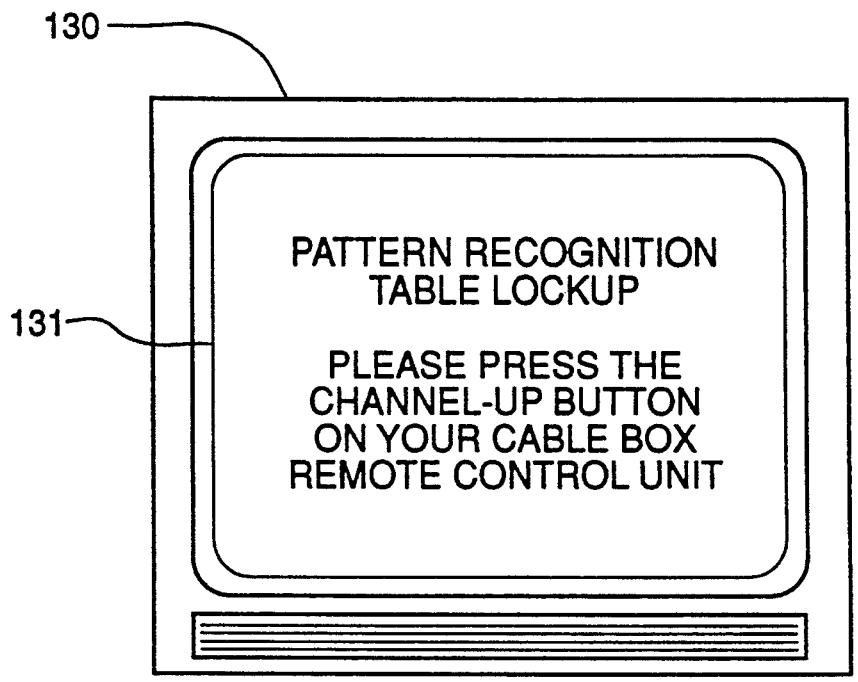
FIGS. 4 and 5 are examples of message screens produced by the present invention.

Microprocessor 127 recalls a message from read only memory 128 and commands character generator 126 to produce a video screen including that message. Character generator 126 cooperates with signal selector/modulator 125 to produce a video signal corresponding to the selected messages. These message prompt the user to operate at least certain of the controls on the remote control transmitter for the desired slave unit. FIG. 4 illustrates an example of such a message appearing on screen 131 of television receiver 130. Receipt of the requested remote control signal enables microprocessor 127 to analyze the coding and store appropriate data in programmable read only memory 129. Following receipt and analysis of each remote control signal, microprocessor 127 selects and displays a message requesting operation of another control.

In the preferred embodiment, microprocessor 127 uses only certain of the possible remote control codes for control of a particular type of slave unit. Microprocessor 127 need only issue ON/OFF mode commands and channel selection commands to cable tuner/descrambler 110. A typical initialization sequence would request operation of the ON/OFF toggle command or separate ON and OFF commands if so equipped. These would be followed by the channel scanning commands for up (FIG. 4) and down, and by the digit commands for direct channel access if so equipped. Microprocessor 127 need only issue ON/OFF mode commands and volume selection commands to television receiver 130. A typical initialization sequence would request operation of the ON/OFF toggle command, or separate ON and OFF commands if so equipped, followed by the volume up and down commands. Microprocessor 127 writes data into programmable read only memory 129 indicating that microprocessor 127 is initialized upon completion of this process.

Figure 5:
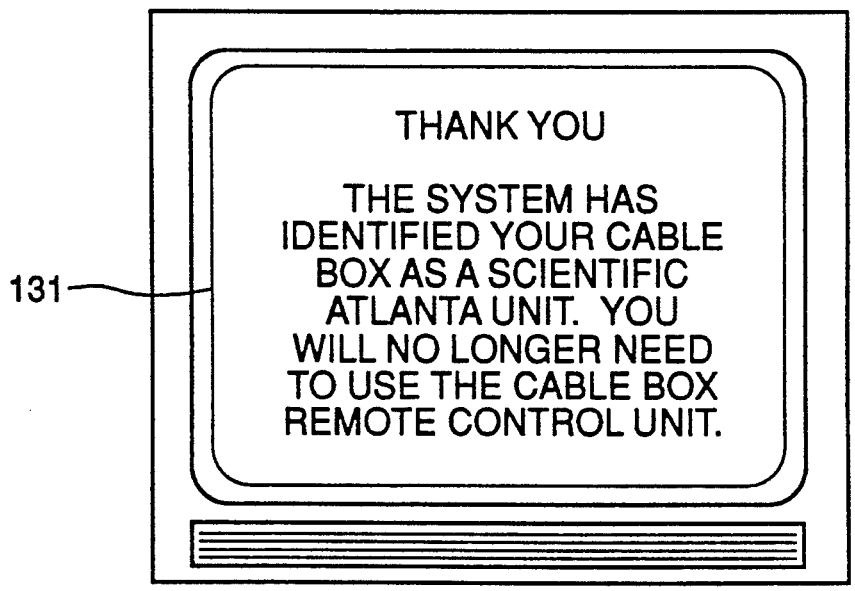

Microprocessor 127 may recognize the requested operation corresponds to one of the remote control code sets stored in read only memory 128. Upon recognition of the fact that the received remote control signals correspond to those employed by a one of the plurality of possible slave units, microprocessor 127 aborts the prompting process for that slave unit. Microprocessor 127 then stores in programmable read only memory 129 the identity of the recognized slave unit. This permits microprocessor 127 to generate the needed remote control signals from the data stored in read only memory 128. Microprocessor 127 preferably recalls a corresponding message indicating to the user that the identity of the slave unit has been recognized for display via character generator 126. FIG. 5 illustrates an example of such a message.

Following initialization, all remote control functions take place via the hand held remote control transmitter for the master unit. If the command is intended for the master unit, then that unit executes the commanded operation. If the command is intended for one of the slave units, then the appropriate remote control signal is transmitted via the remote control transmitter formed as part of the master unit. The slave unit receives this remote control signal and then executes the commanded operation.

In the preferred embodiment video recorder/player 120 is the master unit. Initial operation of a power ON/OFF mode toggle at hand held remote control transmitter 140 causes microprocessor 127 to place video recorder/player 120 in the ON mode. Microprocessor 127 then reads programmable read only memory 129 or read only memory 128 as appropriate to determine the power command for cable tuner/descrambler 110. Microprocessor 127 then controls remote control transmitter 122 to generate the corresponding remote control signal. A similar process is repeated to turn ON television receiver 130. Upon receipt of a channel selection command from hand held remote control transmitter 140, appropriate remote control signals are transmitted to cable tuner/descrambler 110. Any remote control signals dealing with tape operations (record, fast forward, rewind, playback, pause, still frame) and dealing with programming the memory of scheduled future recording are executed directly via microprocessor 127. Lastly, received volume control commands are translated into the appropriate remote control signals for control of television receiver 130 via remote control transmitter 122 and remote control receiver 135. Thus a single hand held remote control transmitter can advantageously control the three units. This single hand held remote control transmitter need be no more complex than the individual remote control transmitters for the three systems.

Having thus described my invention I claim:

1. In a television viewing system of the type including a television receiver that receives control signals, a first hand-held remote transmitter that transmits control signals to at least said television receiver, a first associated unit that provides video signals to said television receiver, and a second hand-held remote transmitter that transmits control signals to at least said associated unit, wherein said television receiver and said first hand-held remote transmitter constitute a master unit and said first associated unit and said second hand-held transmitter constitute a slave unit, said master unit being trainable to transmit control signals to said slave unit, the method of training said master unit as to the required control signal codes for transmission to the slave unit comprising the steps of:

generating displays on the screen of the television receiver requesting the operator to use the second hand-held transmitter of the slave unit to transmit at least certain control signals to said master unit;

receiving said control signals at the master unit from the second hand-held transmitter of the slave unit; and establishing a conversion memory within said master unit, based on such received control signals, to enable said master unit to transmit control signals to the slave unit.

2. The method of claim 1 in which said first associated unit is a video recorder/player.

3. The method of claim 2 in which said television viewing system further includes a second associated unit comprising a tunable video signal receiver and scrambled signal descrambler and a third hand-held remote transmitter, wherein said second associated unit and third hand-held remote transmitter constitute a second slave unit, said master unit being further trainable to transmit control signals to said second slave unit, said method further including the steps of:

generating displays on the screen of the television receiver requesting the operator to use the hand-held transmitter of the second slave unit to transmit at least certain control signals;

receiving said control signals at the master unit from the hand-held transmitter of the second slave unit; and establishing a conversion memory within said master unit, based on such received control signals, to enable said master unit to transmit control signals to the second slave unit.

4. The method of claim 1 in which said associated unit is a tunable video signal receiver and scrambled signal descrambler.

5. The method of claim 1 in which said master unit includes a code memory containing codes representing the control codes of a plurality of known hand-held remote transmitters, said method further comprising the steps of:

comparing said control signals received at the master unit from the second hand-held transmitter with the contents of said code memory; and establishing said conversion memory within said master unit as a matching portion of said code memory if said received control signals match a portion of said code memory.

6. In a television viewing system of the type including a television receiver that receives control signals, a first hand-held remote transmitter that transmits control signals to at least said television receiver, a first associated unit that provides video signals to said television receiver, and a second hand-held remote transmitter that transmits control signals to at least said first associated unit, wherein said first associated unit and said second hand-held remote transmitter constitute a master unit and said television receiver and first hand-held remote transmitter constitute a slave unit, said master unit being trainable to transmit control signals to said slave unit, the method of training said master unit as to the required control signal codes for transmission to the slave unit comprising the steps of:

generating displays on the screen of the television receiver requesting the operator to use the first hand-held transmitter of the slave unit to transmit at least certain control signals to said master unit;

receiving said control signals at the master unit from the first hand-held transmitter of the slave unit; and establishing a conversion memory within said master unit, based on such received control signals, to enable said master unit to transmit control signals to the slave unit.

7. The method of claim 6 in which said first associated unit is a video recorder/player.

8. The method of claim 7 in which said television viewing system further includes a second associated unit comprising a tunable video signal receiver and scrambled signal descrambler and a third hand-held remote transmitter, wherein said second associated unit and third hand-held remote transmitter constitute a second slave unit, said master unit being further trainable to transmit control signals to said second slave unit, said method further including the steps of:

generating displays on the screen of the television receiver requesting the operator to use the third hand-held transmitter of the second slave unit to transmit at least certain control signals;

receiving said control signals at the master unit from the third hand-held transmitter of the second slave unit; and establishing a conversion memory within said master unit, based on such received control signals, to enable said master unit to transmit control signals to the second slave unit.

9. The method of claim 6 in which said first associated unit is a tunable video receiver and scrambled signal descrambler.

10. The method of claim 9 in which said television viewing system further includes a second associated unit comprising a video recorder/player and a third hand-held remote transmitter, wherein said second associated unit and third hand-held remote transmitter constitute a second slave unit, said master unit being further trainable to transmit control signals to said second slave unit, said method further including the steps of:

generating displays on the screen of the television receiver requesting the operator to use the third hand-held transmitter of the second slave unit to transmit at least certain control signals;

receiving said control signals at the master unit from the third hand-held transmitter of the second slave unit; and establishing a conversion memory within said master unit, based on such received control signals, to enable said master unit to transmit control signals to the second slave unit.

11. The method of claim 6 in which said master unit includes a code memory containing codes representing the control codes of a plurality of hand-held remote transmitters, said method further comprising the steps of:

comparing said control signals received at the master unit from the first hand-held transmitter with the contents of said code memory; and establishing said conversion memory within said master unit as a matching portion of said code memory if said received control signals match a portion of said code memory.

12. In a television viewing system of the type including a television receiver that receives control signals, a first hand-held remote transmitter that transmits control signals to at least said television receiver, a video recorder/player that provides video signals to said television receiver, a second hand-held remote transmitter that transmits control signals to at least said video recorder/player, a tunable video signal receiver and scrambled signal descrambler that provides video signals to at least said television receiver, and a third hand-held remote transmitter that transmits control signals to at least said descrambler, wherein said video recorder/player and said second hand-held remote transmitter constitute a master unit and said descrambler and third hand-held remote transmitter constitute a slave unit, said master unit being trainable to transmit control signals to said slave unit, the method of training said master unit as to the required control signal codes for transmission to the slave unit comprising the steps of:

generating displays on the screen of the television receiver requesting the operator to use the third hand-held remote transmitter of the slave unit to transmit at least certain control signals to the master unit;

receiving said control signals at the master unit from the third hand-held transmitter of the slave unit; and establishing a conversion memory within said master unit, based on such received control signals, to enable said master unit to transmit control signals to the slave unit.

13. The method of claim 12 in which said master unit includes a code memory containing codes representing the control codes of a plurality of hand-held remote transmitters, said method further comprising the steps of:

comparing said control signals received at the master unit from the third hand-held transmitter with the contents of said code memory; and establishing said conversion memory as a matching portion of said code memory if said received control signals match a portion of said code memory.

14. In a television viewing system of the type including a television receiver that receives control signals, a first hand-held remote transmitter that transmits control signals to at least said television receiver, a video recorder/player that provides video signals to said television receiver, a second hand-held remote transmitter that transmits control signals to at least said video recorder/player, a tunable video signal receiver and scrambled signal descrambler that provides video signals to at least said television receiver, and a third hand-held remote transmitter that transmits control signals to at least said descrambler, wherein said descrambler and said third hand-held remote transmitter constitute a master unit and said video recorder/player and said second hand-held remote transmitter constitute a slave unit, said master unit being trainable to transmit control signals to said slave unit, the method of training said master unit as to the required control signal codes for transmission to the slave unit comprising the steps of:

generating displays on the screen of the television receiver requesting the operator to use the second hand-held transmitter of the slave unit to transmit at least certain control signals to said master unit;

receiving said control signals at the master unit from the second hand-held transmitter of the slave unit; and establishing a conversion memory within said master unit, based on such received control signals, to enable said master unit to transmit control signals to the slave unit.

15. The method of claim 14 in which said master unit includes a code memory containing codes representing the control codes of a plurality of hand-held remote transmitters, said method further comprising the steps of:

comparing said control signals received at the master unit from the second hand-held transmitter with the contents of said code memory; and establishing said conversion memory as a matching portion of said code memory if said received control signals match a portion of said code memory.

* * * * *